United States Patent
Schropfer

(10) Patent No.: US 8,256,839 B2
(45) Date of Patent: Sep. 4, 2012

(54) METHOD OF PROTECTING AN INFANT OR TODDLER FROM BOTH SUN'S RAYS AND FROM OVERHEATING IN WARM WEATHER

(76) Inventor: Colleen Challenger Schropfer, Red Bank, NJ (US)

( * ) Notice: Subject to any disclaimer, the term of this patent is extended or adjusted under 35 U.S.C. 154(b) by 438 days.

(21) Appl. No.: 12/511,763

(22) Filed: Jul. 29, 2009

(65) Prior Publication Data
US 2010/0026062 A1    Feb. 4, 2010

Related U.S. Application Data

(60) Provisional application No. 61/084,735, filed on Jul. 30, 2008.

(51) Int. Cl.
*A47C 31/00* (2006.01)
(52) U.S. Cl. ............. 297/219.12; 297/219.1; 297/228.13
(58) Field of Classification Search ............... 297/219.1, 297/219.12, 224, 228.11, 228.12, 228.13, 297/229, 256.17
See application file for complete search history.

(56) References Cited

U.S. PATENT DOCUMENTS

| | | |
|---|---|---|
| 598,995 A | 2/1898 | Jacob |
| 2,036,175 A | 3/1936 | Hollander |
| 3,003,164 A | 10/1961 | Calvelage |
| 3,962,738 A | 6/1976 | Menditto |
| 4,183,110 A | 1/1980 | Kidd et al. |
| 4,241,458 A | 12/1980 | Lesesne |
| 4,698,862 A | 10/1987 | Mairs |
| 4,717,056 A | 1/1988 | Carmichael |
| 4,761,032 A | 8/1988 | Sanchez et al. |
| 4,946,221 A | 8/1990 | Livingston |
| 4,993,090 A | 2/1991 | Ranalli |
| 5,058,226 A | 10/1991 | Crosby |
| 5,243,724 A | 9/1993 | Barnes |
| 5,333,769 A | 8/1994 | Skroski |
| 5,432,965 A | 7/1995 | Espinoza |
| 5,437,061 A | 8/1995 | Kenner |
| 5,522,639 A | 6/1996 | Jaime |
| 5,549,354 A | 8/1996 | Rosen |

(Continued)

OTHER PUBLICATIONS

Coolibar "Get Sun Protective Clothing and Sun Block Hats from Coolibar." Jul. 14, 2007 version accessed via Web Archive at http://web.archive.org/web/20070714082658/http://www.coolibar.com/02200.html on Dec. 1, 2011.*

*Primary Examiner* — David Dunn
*Assistant Examiner* — Philip Gabler
(74) *Attorney, Agent, or Firm* — Alan Taboada; Moser Taboada

(57) ABSTRACT

A seat cover and attached footmuff using the latest sun protection fabrics designed for child carriers, strollers and joggers, has a top portion with natural UV protected cotton to block the sun's harmful rays and uses buttons and zippers to ensure the top portion cannot be separated from the bottom portion. The bottom portion is designed to perfectly line the inside of carriers with head, back, seat and leg portions. A plurality of buttons and a single zipper connect the top and bottom portion to allow for maximum flexibility of use and airflow to child. The top portion never covers the child's head or face. The bottom has several openings to thread all harness systems safely. The buttons and zipper can be opened and used in any combination to fold the top unit up to child's chest level or rolled down to completely expose child's lower body and even feet.

17 Claims, 2 Drawing Sheets

U.S. PATENT DOCUMENTS

| | | | |
|---|---|---|---|
| 5,551,109 A | 9/1996 | Tingley et al. | |
| 5,730,490 A | 3/1998 | Mortenson | |
| 5,897,164 A * | 4/1999 | Kagan et al. | 297/219.12 |
| 5,950,261 A * | 9/1999 | Hay et al. | 5/482 |
| 5,956,766 A * | 9/1999 | Benway | 2/69 |
| 5,988,742 A * | 11/1999 | Stevens | 297/219.12 |
| 6,012,189 A | 1/2000 | Dudley | |
| 6,272,683 B1 | 8/2001 | Symms et al. | |
| 6,547,325 B2 * | 4/2003 | Drost et al. | 297/184.13 |
| 6,749,258 B1 * | 6/2004 | Leikin | 297/219.12 |
| 7,097,244 B2 | 8/2006 | Holmgren et al. | |
| 7,210,739 B2 * | 5/2007 | Baines | 297/225 |
| 7,384,098 B1 * | 6/2008 | Allwin | 297/219.12 |
| 2004/0217633 A1 * | 11/2004 | Kassai et al. | 297/219.12 |

* cited by examiner

METHOD OF PROTECTING AN INFANT OR TODDLER FROM BOTH SUN'S RAYS AND FROM OVERHEATING IN WARM WEATHER

CROSS REFERENCE TO RELATED APPLICATIONS

This application claims the benefit of USPTO provisional patent application No. 61/084,735, filed Jul. 30, 2008 by the present inventor, which is hereby incorporated by reference in its entirety.

BACKGROUND

1. Field

Embodiments of the present invention generally relate to stroller and/or infant carrier "bunting" or "muff" accessories, and more particularly, to such accessories designed for sun protection and warm weather use.

2. Description of Related Art

Muff products for strollers and carriers on the market typically are designed to keep infants and toddlers warm, which is a valuable feature in cold weather. Accordingly, such muffs are typically lined with warm fabrics or materials to retain heat and keep out cold and/or harsh elements. Such muffs also typically are designed to cover the entire child. However, these features render such products ineffective in warm weather applications because the child using the product could get dangerously overheated.

Alternatively other devices on the market that claim to protect the child from the sun use tent like structures that completely cover the stroller or carrier with fabrics that may or may not allow for breathability but ultimately block the child's view and might also cause overheating.

Further, there are still other products that are meant to line a stroller or carrier but do not claim to protect the child from the sun because they do not have a top portion.

Thus, there is a need for a product that is designed specifically for use in warm weather, which blocks the sun using the latest fabric technology, will not cause overheating by the child using the product because the product is made from natural fibers, fits into the harness structure and lines the carrier with breathable fabric, and won't block child's view.

Numerous products have been created to do some of the above but none handle all concerns. For example several patents have been issued for products that lack specific art to address the problem of warm weather use, overheating, and sun protection combined. These products ultimately protect the child from the cold using complete enclosures but do not use sun protection technology to block the sun's harmful rays using lightweight cotton fabric. U.S. Pat. No. 6,012,189, issued January, 2000 to Dudley; U.S. Pat. No. 3,962,738, issued June, 1976 to Menditto; U.S. Pat. No. 4,241,458, issued December, 1980 to Lesesne; U.S. Pat. No. 4,761,032, issued August, 1988 to Sanchez et al.; U.S. Pat. No. 4,946,221, issued August, 1990 to Livingston.

As further examples, many products use specific art showing suit-like devices with leg separations, hoods, top-to-bottom zippers and are essentially snow-suits that can fit into a carrier. These devices are clearly meant for cold weather use and offer no explanation for sun protection, or overheating during warm weather. U.S. Pat. No. 3,962,738, issued June, 1976 to Menditto; U.S. Pat. No. 7,530,118, issued May, 2009 to Osbourne et al.; U.S. Pat. No. 6,272,683, issued August, 2001 to Symms. Another disadvantage to these designs is that they do not offer any flexibility for airflow.

Additional patents show art that tent the infant carrier with enclosures that completely cover the infant carrier, are not meant for any other type of stroller or jogger, do not show art that address airflow to the child, breathability, or the fact that they completely block the child's view. U.S. Pat. D559,022, issued January, 2008 to Morales, Cabello, Fernando; U.S. Pat. D462,221, issued September, 2002 to Brewer, Marvelee Johnson. Another disadvantage of these products is that they do not line the back of the stroller or carrier to prevent the child from resting on itchy, sweat-inducing synthetic fabrics that all strollers and carriers are made of; primarily polyester, nylon and acrylic.

Further, some patents have been issued for products that fit into a carrier but drape a blanket-like device over the child that is easily kicked off. U.S. Pat. No. 4,993,090, issued February, 1991 to Ranalli; or exist to enclose child but are not meant to be threaded through harness structures that are mandatory on all carriers and strollers. U.S. Pat. No. 5,243,724, issued September, 1993 to Barnes; U.S. Pat. No. 5,432,965, issued July, 1995 to Espinoza.

SUMMARY

Embodiments of the present invention generally relate to a stroller or infant seat carrier "muff" accessory that was created to serve two purposes: (1) to keep babies, toddlers and/or children protected from the sun with a UPF 50 fabric, and (2) to keep babies, toddlers and/or children as cool as possible in warm weather using natural, breathable fabrics. The invention eliminates the danger of excessive sun exposure by providing a secure, safe and lightweight single top portion of certified UV blocking fabric to protect the child from 90% of the sun's harmful rays while also lining the stroller or carrier's harsh synthetic fabrics that make the child itchy and uncomfortable when they get hot in warm months.

The invention offers at least two unique elements. The first element is the top portion (Labeled "10" on FIG. 2). This layer is a certified UPF rated all cotton fabric. This cotton fabric has been tested and proven to block the sun's UVA and UVB rays. In addition, this cotton fabric is equivalent to a sunblock lotion of SPF 50.

UPF, Ultra-Violet Protection Factor, refers to the amount of UV rays blocked specifically by fabrics. UPF measures both UVB and UVA rays and is a transmission test where fabric gets exposed to a UV source simulating the sun's rays at noon. The amount of UV rays blocked by the tested fabric is measured by a device called a spectrophotometer. The UPF rating refers to how many UV rays are blocked. For example, a UPF 50+ blocks 97.5% of the sun's UVA and UVB rays. Typically available fabrics block as little as 5% of the sun's harmful rays. Notably, fabrics used in the present invention have a certified rating of UPF 50 or higher and block greater than 90% of the sun's harmful rays.

SPF is an abbreviation for Sun Protection Factor. The rating was developed to specifically describe the effectiveness of sunscreen lotions and their ability to block UVB rays. SPF rating numbers; SPF 15, SPF 20 and SPF 30 are the more common ratings seen on sunscreen lotions. The SPF number is determined by dividing 100 by the percentage of ultraviolet radiation transmitted through the sunscreen. For example, if a sunscreen blocks 95% of UVB rays, then 5% are transmitted, so that particular sunscreen would have a rating of SPF 20 (100÷5=20). A sunscreen that blocks 97% of UVB rays would have rating of SPF 30+(100÷3=33).

SPF lotions are problematic for many reasons. They have to be re-applied every two or three hours due to evaporation, washing off or wearing off. They are greasy and messy and the chemicals used in most are not recommended for use on infants.

This top portion (Labeled "10" on FIG. 2) protects the child's legs and lower body from the sun while keeping them comfortable and cool. The invention uses only soft cotton, which allows air to reach the child and help keep them cool. The interior liner of the top portion is a two-inch border (labeled "6" on FIG. 1), which also serves as a second reinforcement for the buttonholes.

The second element of the invention is a bottom portion (labeled "7" on FIG. 1). This portion is also made with soft cotton fabric to maximize the child's comfort and allows for airflow and breathability. Underneath this cotton fabric is another layer of thicker cotton fabric that lies inside of the carrier or stroller and is made out of durable cotton fabric. The reason for this thicker cotton fabric is that it is still soft and breathable but it will absorb any sweat from the child, once again keeping in mind that this was designed to maximize the child's comfort while protecting them from the sun's harmful rays and synthetic fabrics, without the use of suntan lotions.

The second element (e.g., the inside liner) can also be used as a stand-alone product, without the first element (e.g., the top liner). In this case, the second element would be a useful liner for typical strollers or infant carriers. It would protect child from scratchy synthetic fabrics but not offer sun protection because it would not have a single top portion of UPF 50 fabric. However, the top portion cannot be completely separated from the bottom portion to ensure that no part of the product is misplaced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
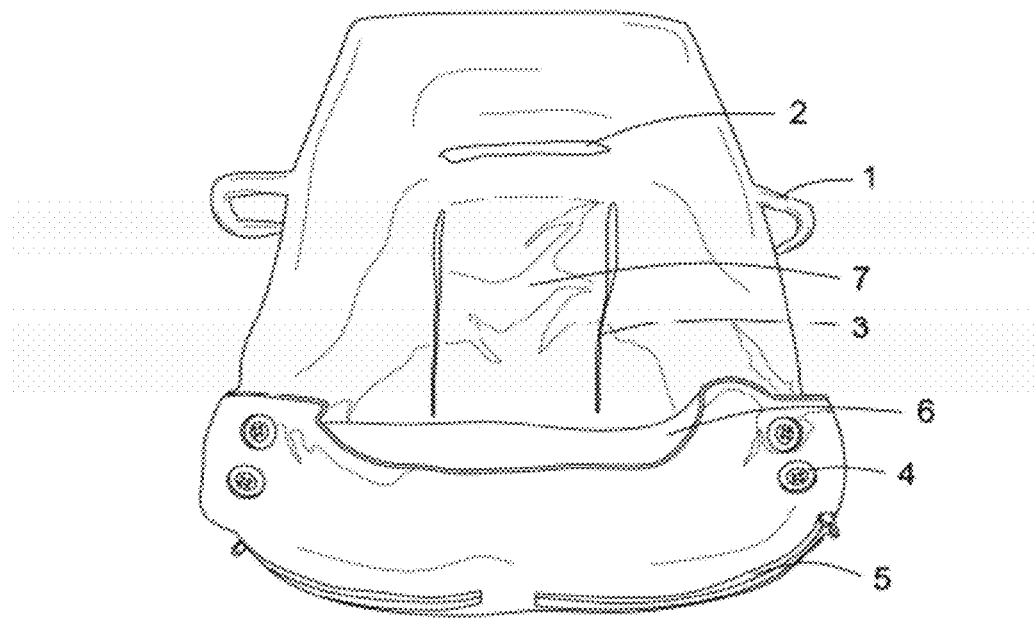
FIG. 1 depicts a front view of a seat cover showing top portion and bottom portion in a closed position in accordance with some embodiments of the present invention.

The present invention generally is designed like a bunting or muff for stroller accessories. However, contrary to conventional muff products for strollers that keep infants and toddlers warm in cold weather, the invention was designed to do just the opposite: it keeps infants and toddlers cool. The Invention was also designed to protect the child's legs and lower bodies from the sun's harmful UVB and UVA rays. There is no other product on the market that is designed to keep the child cool and protect them from the sun.

The cotton fabric that is used in the invention is unique because it is a UPF cotton fabric. This UPF cotton fabric blocks more than 90% of the sun's harmful UVA and UVB rays. This cotton fabric is unlike any other product on the market. Exposing an infant to the sun for as little as fifteen minutes may result in sunburn. A study proved that if an infant becomes sunburned, it could affect the child's skin for the rest of its life. Specifically, a sunburned child is more likely to have problems with skin cancer than a non-sunburned child.

Other muff items on the market may attempt to shade the entire child from the sun with their dome, tent or canopy-like styles. However, these products can block the child's view, which can cause discontent for a child, making the child upset. Moreover, this can also cause the child to overheat. The present invention does not block the view of the child because its front layer comes to the top of the their legs or belly and is designed to be used with the original canopy on the stroller or carrier, thereby removing the danger for the child to overheat, and additionally keeping them happy since their view is not blocked.

Other muff products on the market may have large top portions, which have enough cloth to enclose the child up to his/her neck. This can be restricting and uncomfortable for the child. The present invention is not restricting because its top portion comes up to the top of the child's legs or lower body. The invention was designed to protect their lower bodies while also keeping a significant portion of their bodies exposed to open air; thus keeping them cool.

Other muff items on the market may be connected from top to bottom with a zipper, making breathability virtually impossible. This, again, can cause the child to overheat in warm weather. The present invention is only connected at the bottom for a smaller portion, for example, ten to fourteen inches depending on the size. This ensures that the child does not overheat. The invention has a double-ended zipper at the very bottom of the muff to control breathability for the child while still providing protection from the sun's harmful rays.

The present invention includes fasteners, such as buttons, disposed on the sides of the upper layer. The invention is the only product on the market that has easy to use buttons. These buttons are strategically placed on the muff to ensure breathability for the child. We generally use oversized buttons of 1" or more in diameter for ease of fastening and unfastening. Other muff products typically provide zippers from head to toe, which minimizes breathability and may result in the child dangerously overheating in warm weather.

The invention is made out of cotton fabrics that absorb the child's sweat. Since these cotton fabrics absorb the child's sweat and allow for air circulation through the cotton fabric, the invention maximizes the child's comfort, minimizes the likelihood of the child overheating, while at the same time maximizes the child's protection from the sun's harmful rays.

Figure 2:
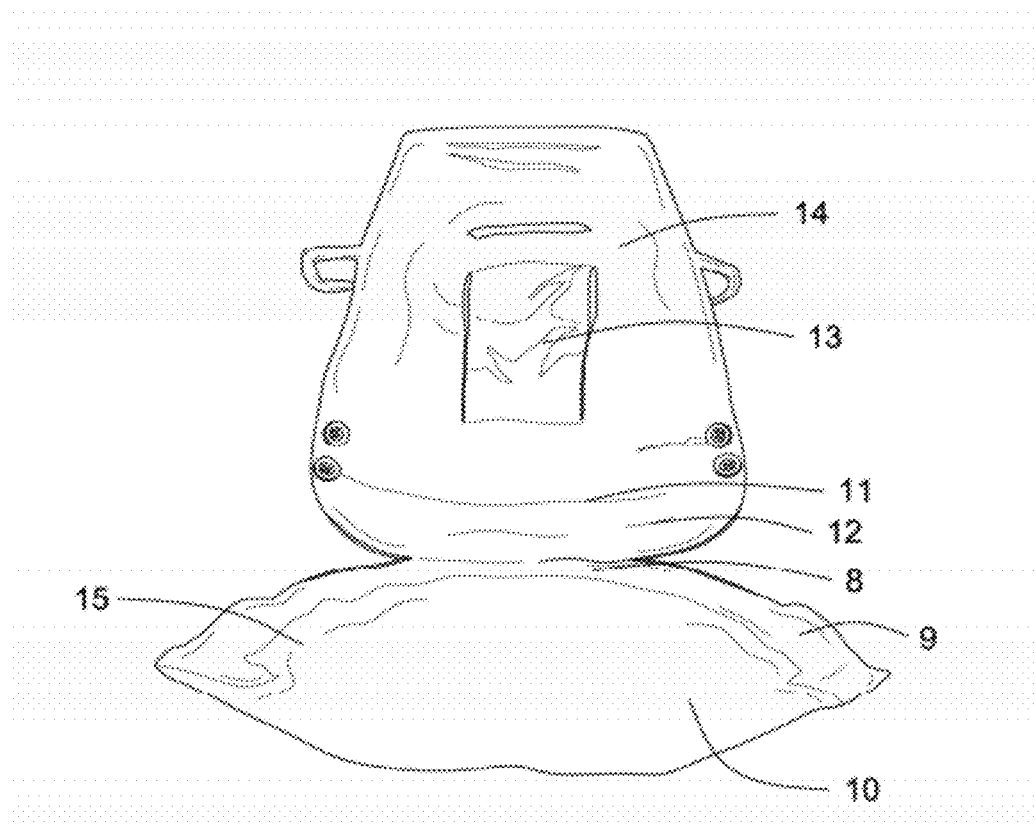
FIG. 2 depicts a front view of a seat cover showing top portion and bottom portion in an open position in accordance with some embodiments of the present invention.
Figure 3:
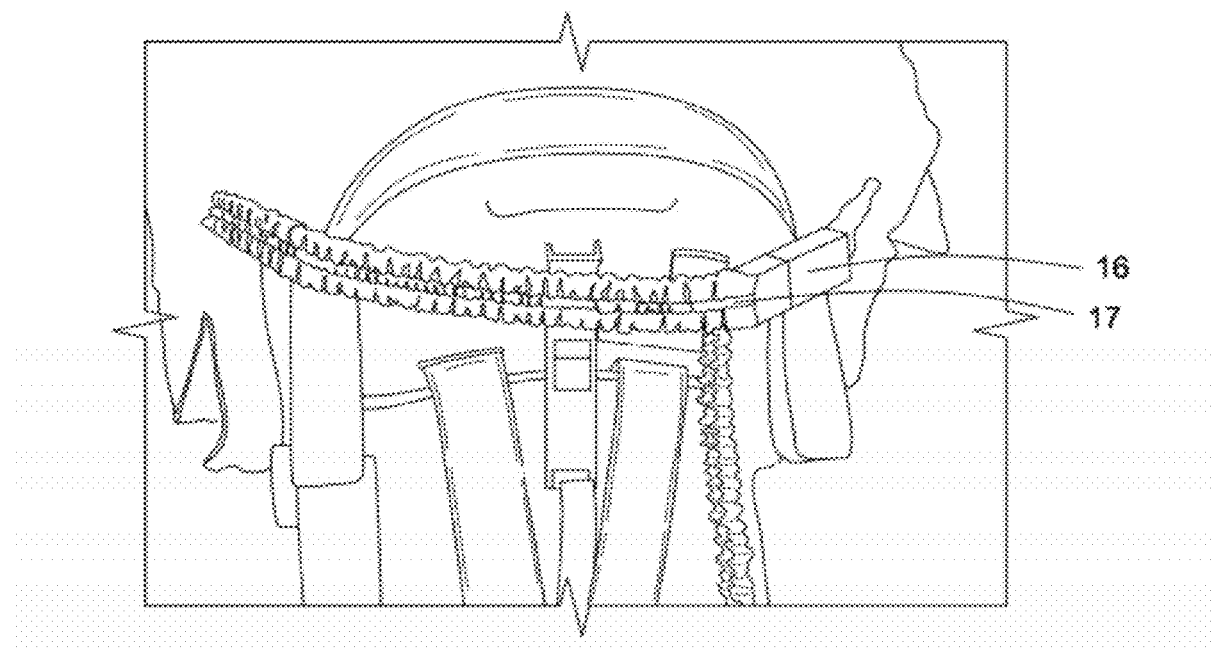
FIG. 3 depicts a rear view of the invention, which has been installed in a seat, showing the elastic band that is both adjustable and able to be separated near its center using a plastic clip position in accordance with some embodiments of the present invention.

The above features and benefits provided may be further appreciated and/or understood with reference to FIGS. 1, 2, and 3. FIG. 1 depicts a front view of the seat cover showing top portion and bottom portion where the zipper's pulls are in contact with each other and the top portion is connected to the bottom portion in only one point along the zipper in accordance with some embodiments of the present invention. Note that the point at which the zipper pulls are in contact is depicted as the center, however the zipper pulls can be adjusted to come into contact with each other at any point on the zipper, allowing the parent to open the top portion on the left side of the seat, the right side of the seat, or the center of the seat. Specifically, FIG. 1 depicts:

1. Adjustable elastic straps wrap around the back of the stroller or infant carrier and clip together making it easy for the unit to fit snugly.

2. An upper slit for a safety harness.

3. Middle slits for a safety harness. The middle slits may be detachably coupleable, such as by providing Velcro along the slit edges.

4. The top portion and bottom portion are coupled together. For example, a number of buttons, four buttons illustratively shown, may secure the top to the bottom together while allowing air flow, thereby preventing the child from becoming too warm or constricted. However, as an added feature, the top portion and bottom portion cannot be fully separated to prevent the top portion from being lost or misplaced. Using any or all of these features provides maximum control of airflow to ensure comfort.

5. A zipper or other suitable fastening mechanism may be provided to couple the bottom portion to the top portion along a bottom portion thereof, thereby helping to secure a child into the invention.

6. A reinforcing border may be provided to facilitate the strength and wear of the top portion and to reinforce the buttonholes. The border may be provided in a Jersey Knit Cotton. The border may be provided in different colors to provide visual, ornamental interest.

7. A bottom portion, or inside liner. This liner may be made with the cotton fabric (e.g., Jersey Knit Cotton) to maximize the child's comfort and breathability. Underneath the cotton fabric is a thicker cotton fabric that lies inside of the carrier or stroller and is made out of durable French Terry. The reason for this thicker cotton fabric is that it is still soft and breathable but it will absorb any sweat from the child, once again keeping in mind that this was designed to maximize the child's comfort while protecting them from the sun's harmful rays, without the use of suntan lotions.

FIG. 2 depicts a front view of the seat cover showing top portion and bottom portion in an open position in accordance with some embodiments of the present invention. Specifically, FIG. 2 depicts:

8. The zipper attachment to open and close invention.

9. Soft cotton fabric border wraps two inches all the way around the bottom portion.

10. UV blocking (UPF50) cotton fabric makes up the top portion of the invention.

11. First bottom slit: allows for bottom safety harness to pull through the invention and secure child into stroller or infant carrier.

12. Second bottom slit: allows for safety harness of stroller or infant carrier to pull through and fasten together.

13. Soft cotton fabric covers the entire surface of the seat to protect child from scratchy, synthetic stroller fabrics that induce sweating.

14. A heavier, soft cotton fabric lines the bottom portion of the invention.

15. Button holes spaced to allow gaps in the top portion and bottom portion thereby allowing greater airflow to child but still offering complete coverage if desired.

FIG. 3 depicts a rear view of the invention, which has been installed in a seat, showing the elastic band that is both adjustable and able to be separated near its center using a plastic clip. Specifically, FIG. 3 depicts:

16. The clip in the elastic band which allows the elastic to be separated for easy installation and then re-attached to provide support behind the seat or stroller.

17. The elastic band is adjustable, allowing for the elastic band to fit around a wide variety of seat sizes.

While the foregoing is directed to embodiments of the present invention, other and further embodiments of the invention may be devised without departing from the basic scope thereof.

What is claimed is:

1. A cover for a seat having restraining straps, comprising:
   a) a bottom portion having a first layer of cotton fabric sewn to a second layer of cotton fabric, the second layer being softer and thinner than the first;
   b) a top portion fabricated from cotton pre-treated with sun-protecting characteristics that together with the bottom portion defines a footmuff;
   c) a single zipper which does not completely separate, thereby permanently connecting said top portion to said bottom portion;
   d) a plurality of buttons connecting said top portion to said bottom portion;
   e) an adjustable elastic strap with clip that allows the strap to separate and secure said bottom portion to said seat; and
   f) a plurality of openings formed in said bottom portion to removably receive the restraining straps of said seat.

2. The cover of claim 1, wherein the bottom portion comprises a shape which covers the entire surface area of said seat.

3. The cover of claim 2, wherein said zipper permanently connects a portion of a lower half of said top portion to a portion of a lower half of said bottom portion by sewing respective halves of the zipper into each of the top and bottom portions, and by using a zipper in which the zipper's two halves cannot completely separate from each other.

4. The cover of claim 3, wherein said zipper has two pulls and no stoppers, allowing the zipper to (a) couple said top portion to said bottom portion continuously along the length of said zipper when the pulls are placed at the opposite ends of the zipper, or, (b) couple said top portion to said bottom portion at any single point along the length of the zipper when the zipper pulls are placed in contact with each other.

5. The cover of claim 1, wherein said buttons couple said top portion to said bottom portion in an area of an outside edge which is not coupleable by said zipper.

6. The cover of claim 5, wherein said top portion extends from a lower edge of the bottom portion to a point below a midpoint of the bottom portion.

7. The cover of claim 6, wherein the top portion is constructed of cotton that is specially treated to provide an ultraviolet-protection-factor (UPF) of 50 or more.

8. The cover of claim 7, wherein the top portion is fabricated from a breathable cotton material to reduce overheating of a child when covered with the top portion.

9. A cover for a seat having restraining straps, comprising:
   a) a bottom portion having a first layer of cotton fabric sewn to a second layer of cotton fabric, the second layer being softer and thinner than the first;
   b) a top portion fabricated from cotton fabric having sun-protecting characteristics that together with the bottom portion defines a footmuff, wherein the top portion extends from a lower edge of the bottom portion to a point below a midpoint of the bottom portion;
   c) a single zipper which does not completely separate, the single zipper having a first half coupled to the top portion and a second half coupled to the bottom portion, wherein the first half and the second half cannot completely separate from each other thereby permanently connecting the top portion to the bottom portion;
   d) a plurality of buttons connecting the top portion to the bottom portion;
   e) an adjustable elastic strap with clip that allows the strap to separate and secure the bottom portion to the seat; and
   f) a plurality of openings formed in the bottom portion to removably receive the restraining straps of the seat.

10. The cover of claim 9, wherein the bottom portion comprises a shape which covers the entire surface area of the seat.

11. The cover of claim 9, wherein the zipper has two pulls and no stoppers, allowing the zipper to (a) couple the top portion to the bottom portion continuously along the length of the zipper when the pulls are placed at the opposite ends of the zipper, or, (b) couple the top portion to the bottom portion at any single point along the length of the zipper when the zipper pulls are placed in contact with each other.

12. The cover of claim 9, wherein the buttons couple the top portion to the bottom portion in an area of an outside edge which is not coupleable by the zipper.

13. The cover of claim 9, wherein the top portion is constructed of cotton that is specially treated to provide an ultraviolet-protection-factor (UPF) of 50 or more.

14. The cover of claim 9, wherein the top portion is fabricated from a breathable cotton material to reduce overheating of a child when covered with the top portion.

15. A cover for a seat having restraining straps, comprising:
a) a bottom portion having a first layer of cotton fabric sewn to a second layer of cotton fabric, the second layer being softer and thinner than the first, wherein the bottom portion comprises a shape which covers the entire surface of the seat;
b) a top portion fabricated from cotton pre-treated with sun-protecting characteristics that together with the bottom portion defines a footmuff, wherein the top portion extends from a lower edge of the bottom portion to a point below a midpoint of the bottom portion;
c) a single zipper which does not completely separate, the single zipper having a first half coupled to the top portion and a second half coupled to the bottom portion, wherein the first half and the second half cannot completely separate from each other thereby permanently connecting the top portion to the bottom portion;
d) a plurality of buttons connecting the top portion to the bottom portion, wherein in the buttons have a diameter of at least 1 inch for ease of fastening and unfastening and wherein the buttons couple the top portion to the bottom portion in an area on an outside edge which is not coupleable by the zipper;
e) an adjustable elastic strap with clip that allows the strap to separate and secure the bottom portion to the seat; and
f) a plurality of openings formed in the bottom portion to removably receive the restraining straps of the seat.

16. The cover of claim 15, wherein the top portion is constructed of cotton that is specially treated to provide an ultraviolet-protection-factor (UPF) of 50 or more.

17. The cover of claim 15, wherein the top portion is fabricated from a breathable cotton material to reduce overheating of a child when covered with the top portion.

* * * * *